(No Model.)

L. HUTCHINS.
TENONING AND BORING MACHINE.

No. 317,999. Patented May 19, 1885.

Witnesses:
J. H. Clergue
E. O. Goodridge

Inventor:
Lewis Hutchins
By J. R. Marvin, Atty.

UNITED STATES PATENT OFFICE.

LEWIS HUTCHINS, OF CORINNA, MAINE.

TENONING AND BORING MACHINE.

SPECIFICATION forming part of Letters Patent No. 317,999, dated May 19, 1885.

Application filed February 7, 1885. (No model.)

*To all whom it may concern:*

Be it known that I, LEWIS HUTCHINS, a citizen of the United States, residing at Corinna, in the county of Penobscot and State of Maine, have invented a new and useful Spoke-Tenoning and Hub and Felly Boring Machine; and I do hereby declare that the following is a full, clear, and exact description of the invention, which will enable others skilled in the art to which it appertains to make and use the same.

My invention relates to an improvement in spoke-tenoning and hub and felly boring machines, and is illustrated in the accompanying drawings, in which—

Figure 1:
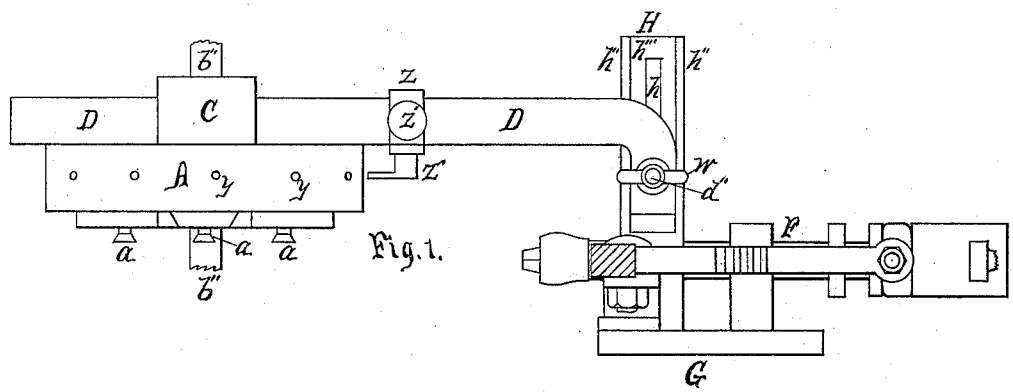
Figure 2:
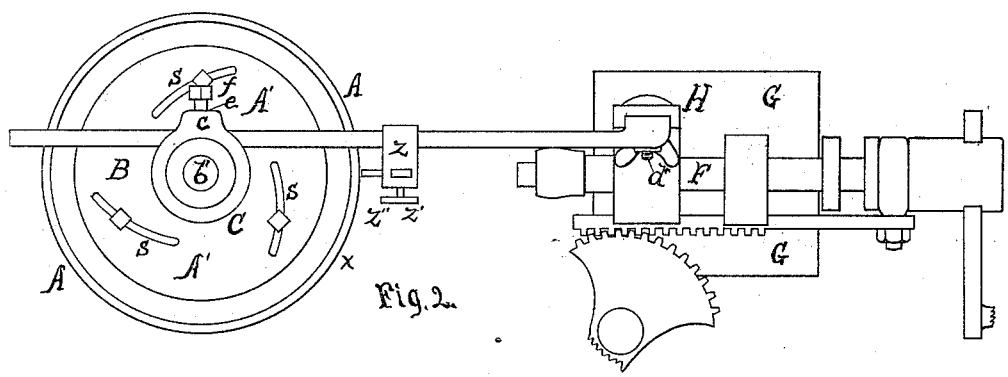
Figure 3:
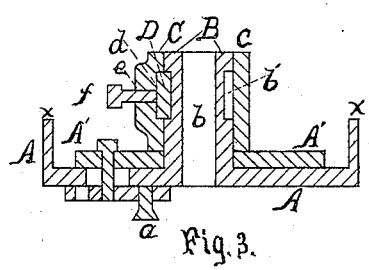

Figure 1 is an elevation. Fig. 2 is a plan. Fig. 3 is a sectional view of a centering device having the hollow standard B, and provided with an attachment for clutching and holding the hubs.

Similar letters refer to corresponding parts throughout the several figures.

The object of my invention is to establish a rigid connection between the tenoning or boring auger and the device by which the hub is held in position, providing at the same time means of adjusting the horizontal position of the auger or the mechanism by which it is held, with reference to the center of the hub, to correspond with the length to be given to the spokes, and also adjusting its vertical position to correspond with the length of the particular hub operated on.

To center and clutch the hub containing the spokes to be tenoned, I use a common centering device consisting of a rotary disk, A', having eccentric slots $s$, acting upon pins inserted into slides on the opposite side of a larger disk, A, which slides carry clutches $a$, adapted to clutch and hold the hub when centered.

Upon the periphery of the disk A is formed the flanged rim $x$, for the purpose hereinafter shown, and the rim $x$ is constructed with small apertures $y$, regularly spaced.

Upon the center of the upper side of the disk A of the centering device I form the upright cylindrical standard B, having around it the external annular grooved channel, $b'$, and provided with the round bore $b$, extending through the disks A and A', for the reception of the round bolt $b''$.

Shaped to fit and revolve upon the standard B is the sleeve or collar C, formed with the lateral swell or projection $c$ upon one side.

Through the sides of the swell $c$, and sometimes extending partially into the adjoining external surfaces of the collar C, I form the horizontal slot $d$, and upon the face of the swell $c$ I form the concave screw $e$ for the reception of the set-screw $f$. I also provide the rigid arm or bar D of any desired length, shaped to fit into the slot $d$ and move longitudinally within it. This arm D may be formed straight for its whole length, or bent or curved at its outer extremity, where it is connected to the bit-stock frame G.

I have shown the arm D curved in the manner aforesaid, which is the more convenient application to my device. In its outer extremity I form a bolt-hole, $d'$, or concave screw-hole.

Upon the frame G, in which the bit-stock F revolves, I form the upright standard H, of suitable length and having the vertical slot $h$, and in the application shown in the drawings the flanged edges $h''$, which form a vertical rectangular channel, $h'''$, in the side of the standard H, and serve to receive and guide the curved end of the arm D, and to keep the bit-stock F and bit parallel to the arm D. The curved end of the arm D is shaped to fit the channel $h'''$, and is slightly bent laterally toward the standard H, just below its downward curve, to admit its free vertical movement in said channel $h'''$.

In operation the hub fitted with the spokes to be tenoned is placed upon an upright stationary round bolt, $b''$, projecting vertically upward from the bench. The centering and clutching device is slipped down over the bolt $b''$ onto the hub, which is brought into position by the centering device A A' and held fast by the clutches $a$. A nut is screwed down onto the head of the bolt $b''$, and the hub and centering and clutching devices are thus firmly held together and prevented from rotation. The curved end of the arm D is introduced into the rectangular channel $h'''$ in the standard H, and the bolt $d''$ being introduced through the slot $h$ and bolt-hole $d'$ in the curved end of the arm D, the arm D is adjusted at any desired point upon the standard H, and rigidly secured by means of a winged nut, $w$. The object of the vertical extension of the slot $h$ being to permit the frame G to be raised or lowered until the longitudinal axes of the bit and the spoke presented to it shall be in the same line, the amount of vertical adjustment is determined by the length of the hub. The inner extremity of the arm D is passed through the slot $d$ in the collar C, and is pushed through said slot until the tenoning-auger meets the outer extremity of a spoke, and the arm D is then rigidly fastened in the slot $d$ by means of the set-screw $f$. The auger is then operated, and as soon as the spoke is tenoned the auger is withdrawn and the bit-stock F, frame G, arm D, and collar C are swung round upon the standard B, having the grooved channel $b'$, until the whole arrangement is in line with the next spoke, and the operation is repeated. The upper edge of the flanged rim $x$ of the disk A is formed to be in the same horizontal plane as the lower edge of the arm D, and serving as a second bearing for the arm D, supports and stiffens it.

The device may be used for boring fellies by simply clamping the fellies to the outer ends of the spokes, and operating as when forming the tenons on the spokes. It may be used for boring hubs by centering and clutching the hubs as before described, and by introducing the arm D farther through the slot $d$ of the collar C, and until the point of the auger reaches the surface of the hub. The arm D is then secured in the collar C as before, and locked to the rim $x$ by a lock or stop consisting of a slide, $z$, working on the arm D, and provided with a vertical slot, $z'$, on one side, in which moves the arm $z''$, bent at a right angle near its lower extremity, which is adapted to enter and fit the apertures $y$ in the flanged rim $x$. The vertical adjustment of the bent arm $z''$ is regulated by a set-screw, $t$, and the distances between the apertures $y$ in the rim $x$ of the disk A are spaced to correspond with the distances between the holes to be bored in the hubs. A hole having been bored in the hub, the arm D is unlocked from the rim $x$, and the arm D and attachments swung round to the point where the next hole is to be bored, as indicated by the proper aperture on the rim $x$. The arm D is then locked to the rim $x$ as before, and the operation repeated.

It is evident that with my device spokes, hubs, and fellies of any length or size can be tenoned and bored without any change in the arrangement of the parts of the machine, except in the adjustment of the arm D in the collar C and standard H.

Having thus described my device, what I claim as my invention, and desire to secure by Letters Patent, is—

1. The within-described attachment to a centering and clutching device, consisting of the combination of the cylindrical standard B, having the bore $b$, and the collar C, fitting over and revolving upon the standard B, and provided with the slot $d$, so shaped as to receive and allow within it the horizontal adjustment of the arm D.

2. In a machine for tenoning spokes or boring hubs or fellies, the rigid arm D, so formed and shaped as to be adjustable horizontally in the collar C of the centering and clutching device A A' and vertically in the standard H of the frame G.

3. In a machine for tenoning spokes or boring hubs or fellies, the combination of the centering and clutching device A A', cylindrical standard B, having the bore $b$, revolving collar C, having the swell $c$ and slot $d$, bolt $b''$, rigid arm D, bit-stock frame G, having the upright standard H, formed with the longitudinal slot $h$ and flanges $h''$, and means of securing the ends of the arm D in the collar C and standard H when adjusted, all as shown and described, and substantially as and for the purpose specified.

LEWIS HUTCHINS.

Witnesses:
G. V. LANPHER,
E. S. KNOWLES.